United States Patent [19]
Shay et al.

[11] Patent Number: 5,709,789
[45] Date of Patent: Jan. 20, 1998

[54] ELECTROCHEMICAL CONVERSION OF NITROGEN CONTAINING GAS TO HYDROXYLAMINE AND HYDROXYLAMMONIUM SALTS

[75] Inventors: Christopher D. Shay; Hossein Sharifian, both of Austin, Tex.

[73] Assignee: Sachem, Inc., Austin, Tex.

[21] Appl. No.: 734,858

[22] Filed: Oct. 23, 1996

[51] Int. Cl.[6] .......................... C25B 3/00; B01D 59/42; B01D 59/50; B01D 61/44

[52] U.S. Cl. .......................... 205/437; 204/537; 204/539; 204/541

[58] Field of Search .......................... 204/537, 539, 204/541, 544; 205/437

[56] References Cited

U.S. PATENT DOCUMENTS

| | | | |
|---|---|---|---|
| 4,321,313 | 3/1982 | Langer et al. | 429/13 |
| 4,645,579 | 2/1987 | Weiss et al. | 204/182.4 |
| 4,818,353 | 4/1989 | Langer et al. | 204/74 |
| 4,849,073 | 7/1989 | Dotson et al. | 204/101 |
| 4,968,394 | 11/1990 | Dotson et al. | 204/101 |
| 5,281,311 | 1/1994 | Sharifian et al. | 204/101 |
| 5,447,610 | 9/1995 | Sharifian | 205/437 |

FOREIGN PATENT DOCUMENTS

| | | | |
|---|---|---|---|
| 2602802 | 8/1987 | France | C25B 3/04 |

OTHER PUBLICATIONS

Bathia et al., The Canadian Journal of Chemical Engineering, vol. 57, pp. 631-637, 1979, "Hydroxylamine Production by Electroreduction of a Nitric Oxide in a Trickle Bed Cell."

Colucci et al., Electrochimica Acta, vol. 4, pp. 521-528, 1985, "The Electro Reduction of Nitric Oxide on Bulk Platinum in Acid Solutions."

Primary Examiner—Kathryn L. Gorgos
Assistant Examiner—Edna Wong
Attorney, Agent, or Firm—Renner, Otto, Boisselle & Sklar

[57] ABSTRACT

The present invention relates to a method of preparing hydroxylamine in an electrochemical cell, comprising the steps of: providing an electrochemical cell comprising an anode, a cathode, a bipolar membrane positioned between the anode and the cathode, the bipolar membrane having an anion selective side facing the anode and a cation selective side facing the cathode, and a divider positioned between the bipolar membrane and the anode, thereby defining a feed compartment on the cation selective side of the bipolar membrane, a recovery compartment on the anion selective side of the bipolar membrane, and an anolyte compartment between the divider and the anode; charging the feed compartment with an acidic electrolyte and the recovery and anolyte compartments with a solution; introducing nitrogen containing gas into the feed compartment; passing a current through the electrochemical cell thereby producing hydroxylammonium salt in the feed compartment; transferring at least a portion of the hydroxylammonium salt from the feed compartment to the recovery compartment thereby producing hydroxylamine in the recovery compartment; and recovering hydroxylamine from the recovery compartment.

20 Claims, 1 Drawing Sheet

ELECTROCHEMICAL CONVERSION OF NITROGEN CONTAINING GAS TO HYDROXYLAMINE AND HYDROXYLAMMONIUM SALTS

TECHNICAL FIELD

The present invention relates to methods for preparing hydroxylamine or hydroxylammonium salts. More particularly, the invention relates to methods for electrochemically converting nitrogen containing gas to hydroxylammonium salts, and then converting hydroxylammonium salts to hydroxylamine.

BACKGROUND OF THE INVENTION

Hydroxylammonium salts may be represented by the formula:

$$(NH_3OH)^+_y X^{-y}$$

wherein X is an anion of an acid and y is a number equal to the valence of X. Hydroxylammonium salts are compounds which have a variety of applications. For instance, hydroxylammonium nitrate may be used as a component of liquid propellant and as a reducing agent in photographic operations. In some of these applications, it is desirable that a hydroxylammonium salt solution of high purity is available.

There exist several production methods to manufacture hydroxylammonium salts. In the case of hydroxylammonium nitrate for example, some of these methods include: electrodialysis of hydroxylammonium chloride and nitrate; reaction of hydroxylammonium sulfate and barium nitrate; three-step cation exchange process employing hydroxylammonium sulfate and nitric acid; and electrolytic reduction of nitric acid. Some of these methods, however, do not provide hydroxylammonium salt solutions of high purity which some applications of the compound require. As a result, procedures have been developed to purify the hydroxylammonium salt solutions produced by existing methods. Nevertheless, there remains a substantial demand for large quantities of high purity hydroxylammonium salt solutions.

Hydroxylamine is useful as an intermediary in chemical processes especially in the pharmaceutical and agricultural industries. It is also useful in stripper formulations. Stripper formulations may be used to remove photoresists from or clean a substrate. For example, hydroxylamine stripper solutions are used to remove polyimide coatings from metal foil. Hydroxylamine stripper solutions are extensively utilized in the printed circuit board and semiconductor industries.

Frequently, solutions of hydroxylamine, especially solutions prepared from hydroxylammonium salts, contain undesirable amounts of impurities such as salts, metals and larger molecular weight organic materials. Thus, there also exists a need for hydroxylamine solutions having high purity.

French Patent 2,602,802 is directed to an electrolytic process to directly produce high purity solutions of hydroxylammonium nitrate from nitric acid. In particular, a process is described for producing by electrolysis a hydroxylammonium nitrate solution in an electrochemical cell containing a cathode compartment, an anode compartment and a separator between the cathode compartment and anode compartment. The process is characterized in that it includes the following operations: (a) introducing a catholyte, essentially containing an aqueous nitric acid solution, in the cathode compartment; (b) introducing an anolyte solution into the anode compartment; (c) electrolyzing the catholyte to a cathode potential between about 0.5 and 1.4 volts compared to the standard calomel electrode, while keeping the temperature of the reaction to the cathode below about 50° C., in order to produce a hydroxylamine solution; and (d) recovering the hydroxylammonium nitrate solution from the cathode compartment.

U.S. Pat. No. 4,645,579 relates to aqueous solutions of hydroxylamine which are prepared from aqueous hydroxylammonium salt solutions by electrodialysis by a method in which the aqueous hydroxylammonium salt solution is fed into the middle zone of an electrolysis cell, which is divided into a cathode zone, an anode zone and a middle zone by means of semipermeable membranes, and is electrolyzed, and the catholyte used is an alkali metal hydroxide solution containing ammonia and/or amines.

The production of hydroxylamine by the electroreduction of nitric oxide in sulfuric acid is described by L. J. J. Janssen et al in Electrochimica Acta, 1977, Vol. 22, pp. 27–30 and by M. L. Bathia et al in The Canadian Journal of Chemical Engineering, Vol. 57, October 1979, pp. 631–7. Janssen et al utilize a platinum cathode, and Bathia et al utilize a cathode bed of tungsten carbide particles. The electroreduction of nitric oxide on bulk platinum in perchloric acid and sulfuric acid solutions is described by J. A. Colucci et al in Electrochimica Acta, Vol. 30, No. 4, pp. 521–528, 1985.

U.S. Pat. No. 5,281,311 relates to a process in an electrolysis cell involving (A) providing an electrolysis cell containing an anolyte compartment containing an anode, a catholyte compartment containing an oxygen-consuming cathode and an anionic divider separating the anolyte and catholyte compartments; (B) providing an aqueous solution containing an acid and water to the anolyte compartment, and an aqueous solution containing hydroxylamine salt, water and optionally, an acid to the catholyte compartment; (C) charging an oxygen-containing gas to the catholyte compartment; (D) passing a direct current through the electrolysis cell for a period of time effective to reduce the acid content in the catholyte compartment and/or to convert the salt to a hydroxylamine; and (E) recovering a hydroxylamine or a hydroxylamine salt solution containing a reduced amount of acid from the catholyte compartment.

U.S. Pat. No. 5,447,610 relates to preparing hydroxylamine and hydroxylammonium salts by electrolytically reducing a mixture containing at least one nitrogen oxide and either a neutral electrolyte to form hydroxylamine or an acidic electrolyte such as an organic or inorganic acid to form a hydroxylammonium salt. The electrolytic reduction is conducted in an electrolysis cell containing an anolyte compartment containing an anode, a catholyte compartment containing a cathode, and a divider separating the anolyte and catholyte compartments where the mixture of at least one nitrogen oxide and the electrolyte is present in the catholyte compartment, and an acid is present in the anolyte compartment.

SUMMARY OF THE INVENTION

In one embodiment, the present invention relates to a method of preparing hydroxylamine in an electrochemical cell, comprising the steps of: providing an electrochemical cell comprising an anode, a cathode, a bipolar membrane positioned between the anode and the cathode, the bipolar membrane having an anion selective side facing the anode and a cation selective side facing the cathode, and a divider positioned between the bipolar membrane and the anode, thereby defining a feed compartment on the cation selective side of the bipolar membrane, a recovery compartment on the anion selective side of the bipolar membrane, and an anolyte compartment between the divider and the anode; charging the feed compartment with an acidic electrolyte and the recovery and anolyte compartments with a solution; introducing nitrogen containing gas into the feed compartment; passing a current through the electrochemical cell thereby producing hydroxylammonium salt in the feed compartment; transferring at least a portion of the hydroxylammonium salt from the feed compartment to the recovery compartment thereby producing hydroxylamine in the recovery compartment; and recovering hydroxylamine from the recovery compartment.

In another embodiment, the present invention relates to a method of preparing a hydroxylammonium salt in an electrochemical cell, comprising the steps of: providing an electrochemical cell comprising an anode, a cathode, and a bipolar membrane positioned between the anode and the cathode, the bipolar membrane having an anion selective side facing the anode and a cation selective side facing the cathode, thereby defining a feed compartment on the cation selective side of the bipolar membrane and an anolyte compartment on the anion selective side of the bipolar membrane; charging the feed compartment with an acidic electrolyte and the anolyte compartment with a solution; introducing nitrogen containing gas into the feed compartment; passing a current through the electrochemical cell thereby producing a hydroxylammonium salt in the feed compartment; and recovering the hydroxylammonium salt from the feed compartment.

The present invention provides an electrolytic process for preparing hydroxylamine and hydroxylammonium salts containing reduced amounts of ammonium products. The process consumes a reduced amount of electric energy when compared to nitric acid reduction and does not require a mercury cathode. Moreover, the present invention permits recycling of acid, thereby lowering production costs as well as lowering pollution output as compared to conventional methods.

DESCRIPTION OF THE PREFERRED EMBODIMENTS

Figure 1:
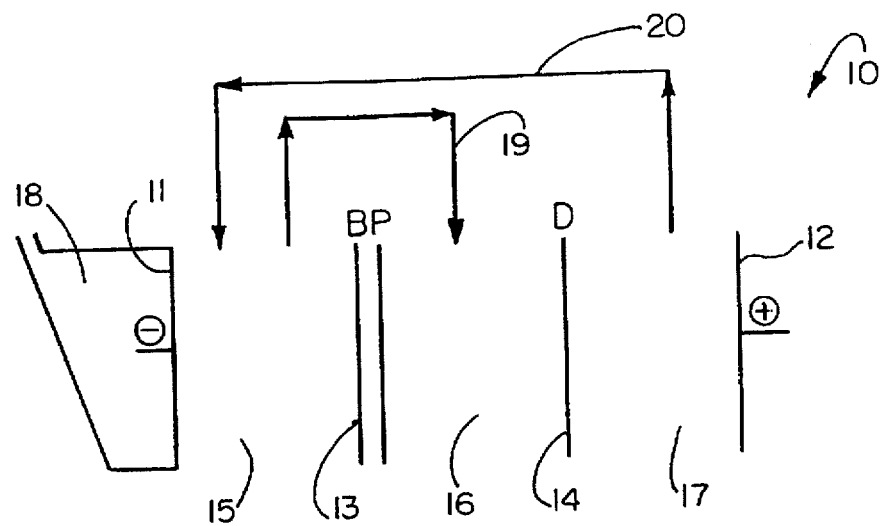
FIG. 1 is a schematic cross-section of an electrochemical cell useful in preparing hydroxylamine or the hydroxylammonium salts of the invention.

In one embodiment of the invention, the process for preparing hydroxylamine or hydroxylammonium salts involves electrochemically reducing nitrogen oxide gas in the presence of an acidic electrolyte to form a hydroxylammonium salt.

Nitrogen containing gas and an acidic electrolyte are charged to the feed compartment. Nitrogen containing gas as used herein includes any gas containing an atom of nitrogen. Examples of nitrogen containing gas include nitrogen oxide gas and nitrogen-hydrogen gas. Nitrogen oxide gas as used herein is intended to mean a gas containing nitrogen and oxygen atoms. Examples of nitrogen oxide gas include one or more of nitric oxide (NO), nitrogen dioxide ($NO_2$), nitrogen trioxide ($NO_3$), dinitrogen trioxide ($N_2O_3$), nitrogen pentoxide $N_2O_5$. Nitric oxide is a preferred nitrogen oxide in the process of the invention. Nitrogen-hydrogen gas includes ammonia, hydrazine, and derivatives thereof. Nitrogen containing gas may also be any gas containing nitrogen containing gas, for instance, a mixture of one or more inert gases and nitrogen oxide gas. Inert gases include nitrogen and the noble gases. The noble gases include helium, neon, argon, krypton, xenon and radon. Additional examples of nitrogen containing gas, and in particular, nitrogen oxide gas include nitrogen and nitrogen oxide, helium and nitrogen oxide, neon and nitrogen oxide, argon and nitrogen oxide, and nitrogen oxide and at least one of nitrogen, helium, neon and argon.

The acidic electrolyte generally will comprise an acid which may be an organic or inorganic acid in water, a mixture of water and one or more organic solvents, or in some instances an organic solvent such as an alcohol. The water used in any of the solutions of the present invention is preferably deionized water, and more preferably very pure deionized water.

Specific examples of inorganic acids represented by formula $H_yX$ which may be utilized in the acidic electrolyte with nitrogen oxide include nitric acid, halogen acids such as hydrofluoric acid, hydrochloric acid, hydrobromic acid and hydriodic acid, sulfuric acid, sulfurous acid, perchloric acid, boric acid and phosphorus acids such as phosphorous acid and phosphoric acid. Nitric acid and sulfuric acid are preferred inorganic acids. Examples of organic acids represented by the formula $H_yX$ include carboxylic and polycarboxylic acids such as formic acid, acetic acid, propionic acid, citric acid, oxalic acid, etc.; organic phosphorus acids such as dimethylphosphoric acid and dimethylphosphinic acid; or sulfonic acids such as methanesulfonic acid, ethanesulfonic acid, 1-pentanesulfonic acid, 1-hexanesulfonic acid, 1-heptanesulfonic acid, benzenesulfonic acid, toluenesulfonic acid, etc.

A solution is charged to the recovery and anolyte compartments. The term solution means aqueous and nonaqueous solutions operable in the invention. Thus, a solution may contain one or more of water, protic solvents, organic solvents such alcohols and the like. In one embodiment, water is charged to the recovery and anolyte compartments. In another embodiment, an ionic compound in water, a mixture of water and one or more organic solvents, or in some instances an organic solvent, is charged to the recovery and anolyte compartments.

The ionic compound used in the invention is a chemical compound that ionizes in solution, such as an electrolyte. Examples of ionic compounds include salts, metal salts and acids or any compound which forms an anion and cation when dissolved in water. In a preferred embodiment, the ionic compound is the same as the acid in the feed compartment. In another embodiment, the ionic compound is different from the acid in the feed compartment. The electrochemical cells may contain one or more ionic compounds.

The solution charged to the feed compartment may also contain a stabilizer for the hydroxylamine formed in the compartment. Examples of stabilizers include quinoline derivatives, thiocarboxylic acids, thiosulfates, hydroxy anthraquinone, etc. Specific examples include 8-hydroxyquinoline, morin hydrate and quercetin. The amount of stabilizer in the solution may range from about $5 \times 10^{-4}\%$ to about 1% by weight based on the weight of electrolytes present.

The hydroxylammonium salts which can be produced in the feed compartment from nitrogen containing gas in accordance with the process of the present invention may be represented by the formula

wherein X is an anion of an acid, such as any of the acids described above, and y is a number equal to the valence of X. Specific examples of anions include $Cl^-$, $Br^-$, $SO_4^{-2}$, $HSO_4^-$, $PO_4^{-3}$, $H_2PO_4^{-1}$, $HPO_4^{-2}$, etc.

Specific examples of hydroxylammonium salts which can be prepared in accordance with this invention include hydroxylammonium sulfate, hydroxylammonium nitrate, hydroxylammonium hydrochloride, hydroxylammonium fluoride, hydroxylammonium formate, hydroxylammonium acetate, hydroxylammonium phosphate, hydroxylammonium methylsulfonate, hydroxylammonium toluene sulfonate, etc.

The electrochemical cell used in the novel process of the present invention contains an anode, a cathode, a bipolar membrane and a divider. In an embodiment where only hydroxylammonium salts are produced, the divider may be omitted. In a general sense, the cells may be composed of cell materials which are compatible with the materials being charged into the cells. The cell materials must be particularly able to tolerate an acidic environment. A feed compartment is located between the cathode and the bipolar membrane, a recovery compartment is located between the bipolar membrane and the divider, and in anolyte compartment is located between the divider and the anode. In one embodiment where only hydroxylammonium salts are produced, the electrochemical cell does not contain a divider or a recovery compartment, and the anolyte compartment is located between the bipolar membrane and the anode.

The cells may be adapted to operate at atmospheric pressure or at elevated pressures. In one presently preferred embodiment the cell is one capable of operating at elevated pressures of at least about 1 psig up to about 10 psig or higher. Since the anode and cathode do not directly enter into the reaction, they also may be made from a variety of materials that do not react with the solutions added to the cells. In a preferred embodiment, the cathode comprises a material which exhibits electrocatalytic activity for nitrogen oxide reduction to hydroxylamine or hydroxylammonium salts. Suitable cathodes may comprise tungsten carbide, silver, manganese dioxide or platinum. For example, the cathode may comprise tungsten carbide, platinum on carbon, silver on carbon, manganese dioxide on carbon, or a platinized titanium.

The cathode is generally a gas diffusion cathode. The conventional cathode gas-diffusion cathode may comprise a conventional cathode structure formed of a suitable porous hydrophobic material such as polytetrafluoroethylene (PTFE), mixed with carbon black and a catalyst. In one preferred embodiment, the gas diffusion cathode is a hydrophobic cathode comprising a porous element having a first surface portion which is in contact with the nitrogen containing gas charged to the feed compartment and a second surface portion which is in contact with the acidic electrolyte in the feed compartment. For example, the gas diffusion cathode may comprise a porous material such as a PTFE fabric or a carbon cloth fabric coated on one side with a suitable catalytic material such as platinum, silver, gold, carbon, cobalt and mixtures thereof to form an "active layer." Specific preferable combinations include carbon-platinum, gold-platinum, silver-platinum and cobalt-platinum.

Commercially available gas diffusion cathodes include an ELAT type gas diffusion cathode having an integrated stainless steel mesh current collector with an alloy of PtCo on a hydrophobic PTFE containing Vulcan XC-72 carbon and an EFCG type gas diffusion cathode having an integrated stainless steel mesh current collector with an alloy of PtCo on a Toray carbon substrate.

In a preferred embodiment, the active layer is modified by a sulfur treatment. As a result, the activity of the active layer is maintained over a long period of time. The treatment involves contacting the active layer with an oxidized sulfur-containing species which is chemisorbable on the active layer until the oxidized sulfur-containing species has become bound to the active layer; adjusting the amount of oxidized sulfur-containing species bound to the active layer to between 10 and 95 atomic percent of the metal of the active layer; and electrochemically or chemically reducing the oxidized sulfur-containing species bound to the active layer. Examples of the oxidized sulfur-containing species include sulfur dioxide, analogs of thiosulfate, sulfites, thiosulfites and the like. These procedures are known by those skilled in the art and specific procedures are described in U.S. Pat. No. 4,818,353, which is hereby incorporated by reference.

Figure 2:
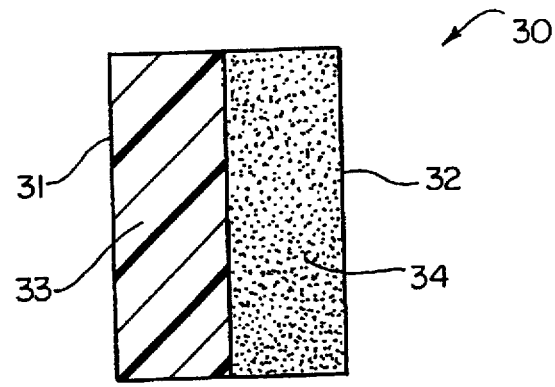
FIG. 2 is a schematic cross-section of an example of a gas diffusion cathode useful in the invention.

FIG. 2 is a schematic illustration of one embodiment of a gas-diffusion electrode useful in the process of the present invention. As shown in FIG. 2, the cathode 30 is formed essentially of a two-component laminate defining the gas contacting surface 31 and the opposed electrolyte contacting surface or "active surface" 32. An electrically conductive porous gas carrier layer 33 defines the gas-contacting surface 31, and layer 33, for example, may comprise a mixture of a hydrophobic material such as porous PTFE and an electrically conductive material such as carbon black. Layer 34, the active layer, comprises a suitable catalytic material such as platinum, silver, gold, etc., and, optionally, carbon powder. In some instances, the materials of layer 33 and layer 34 may be intermixed into a single layer. The entire structure of cathode 30 in FIG. 2 is porous. The function of layer 33 is to allow ready transmission of nitrogen containing gas to the active layer 34. Since layer 33 is hydrophobic, it serves to repel liquid electrolyte and prevent the liquid electrolyte from passing through the electrode into the gas side of the cell.

Various materials can be used as anodes in the electrochemical cells. For example, the anode may be made of metals such as titanium-coated electrodes, tantalum, zirconium, hafnium or alloys of the same. Generally, the anodes will have a non-passivable and catalytic film which may comprise metallic noble metals such as platinum, iridium, rhodium or alloys thereof, or a mixture of electroconductive oxides containing at least one oxide or mixed oxides of a noble metal such as platinum, iridium, ruthenium, palladium or rhodium. In one embodiment, the anode is a dimensionally stable anode such as an anode having a titanium base with ruthenium and/or iridium oxides thereon.

The electrochemical cell utilized in the process of most of the embodiments of the present invention contains at least one divider or separator, such as ionic or nonionic selective membranes. The dividers and/or bipolar membranes function as diffusion barriers and/or gas separators.

In one embodiment, the dividers or separators which can be utilized in the present invention can be selected from a wide variety of microporous diffusion barriers, screens, filters, diaphragms, etc., which contain pores of the desired size allow anions of the hydroxylammonium salt to migrate toward the anode. The microporous dividers can be prepared from various materials including plastics such as polyethylene, polypropylene and Teflon, ceramics, etc. Microporous dividers such as nonionic dividers can be used, for example, in addition to the dividers listed in the Figures. Specific examples of commercially available microporous separators include: Celanese Celgard and Norton Zitex.

In a preferred embodiment, the divider is an anion selective membrane. Any anion selective membrane may be utilized including membranes used in processes for the desalination of brackish water. Preferably, membranes should be selective with respect to the particular anions present in the cell (e.g., halide ions). The preparation and structure of anionic membranes are described in the chapter entitled "Membrane Technology" in *Encyclopedia of Chemical Technology*, Kirk-Othmer, Third Ed., Vol. 15, pp. 92–131, Wiley & Sons, New York, 1985. These pages are hereby incorporated by reference for their disclosure of various anionic membranes which may be useful in the process of the present invention.

Among the anion selective membranes which may be utilized and which are commercially available are the following: AMFLON, Series 310, based on fluorinated polymer substituted with quaternary ammonium groups produced by American Machine and Foundry Company; IONAC MA 3148, MA 3236 and MA 3475, based on polymer substituted with quaternary ammonium derived from heterogenous polyvinylchloride produced by Ritter-Pfaulder Corp., Permutit Division; Tosflex IE-SF 34 or IE-SA 48 made by Tosoh Corp. which is a membrane designed to be stable in alkaline media; NEOSEPTA AMH, NEOSEPTA ACM, NEOSEPTA AFN or NEOSEPTA ACLE-SP from Tokuyama Soda Co.; and Selemion AMV and Selemion AAV from Asahi Glass. In one embodiment, the Tosflex IE-SF 34 and NEOSEPTA AMH anion exchange membranes are preferred.

The bipolar membranes used in the electrochemical cells are composite membranes containing three parts: a cation selective side or region, an anion selective side or region, and an interface between the two regions. When a direct current passes across a bipolar membrane, with the cation selective side toward or facing the cathode, electrical conduction is achieved by the transport of $H^+$ and $OH^-$ ions which are produced by the dissociation of water which occurs at the interface under the influence of an electrical field. Bipolar membranes are described, for example, in U.S. Pat. Nos. 2,829,095, 4,024,043 (single film bipolar membranes) and in U.S. Pat. No. 4,116,889 (cast bipolar membranes). The bipolar membranes useful in the process of the present invention include NEOSEPTA BIPOLAR 1 by Tokuyama Soda, WSI BIPOLAR, and Aqualytics Bipolar membranes.

The electrochemical cell may contain a gas chamber next to the gas diffusion cathode. Nitrogen containing gas is injected into the gas chamber and then forced through the gas diffusion cathode into the feed compartment.

The anolyte compartment of the electrochemical cell contains a solution of an ionic compound. Aqueous solutions are preferred. The ionic compound in the anolyte compartment may be the same or different from the acid in the feed compartment. The ionic compound in the anolyte compartment may be the same or different from the ionic compound in the recovery compartment. Any ionic compound can be used in the anolyte compartment, but in a preferred embodiment the ionic compound in the anolyte compartment is the same as the acid in the feed compartment thereby contributing to preparing hydroxylamine of higher purity. Additionally, when the ionic compound in the anolyte compartment is the same as the acid in the feed compartment, the electrochemical cell runs more efficiently as acid, which is produced in the anolyte compartment may be recycled to the feed compartment. That is, the acid may be physically removed from the anolyte compartment and transferred to the feed compartment, as needed. The concentration of the ionic compound in the anolyte compartment is from about 0.01M to about 5M, and preferably from about 0.1M to about 0.5M. The concentration of the ionic compound in the anolyte compartment may be the same, higher or lower than the concentration of the ionic compound in the recovery compartment or the acid in the acidic electrolyte.

The feed compartment of the electrochemical cell contains nitrogen containing gas and an acidic electrolyte as described above. The choice of acid in the acidic electrolyte is determined by the particular hydroxylammonium salt desired to be produced. The acid in the acidic electrolyte should contain the anion of the desired hydroxylammonium salt. That is, if hydroxylammonium nitrate is the desired salt, the acid in the catholyte mixture is nitric acid. If the desired salt is hydroxylammonium chloride, the acid is hydrochloric acid. If the desired salt is hydroxylammonium acetate, the acid in the catholyte mixture should be acetic acid. The amount of nitrogen oxide in the feed compartment is an amount to provide a saturated solution or mixture. The concentration of acid in the acidic electrolyte may be from about 0.01M to about 5M. Preferably the acid concentration is from about 0.5M to about 1M. The concentration of the acid in the acidic electrolyte may be the same, higher or lower than the concentration of the ionic compound in the recovery compartment or the anolyte compartment.

The recovery compartment of the electrochemical cell initially contains a solution of an ionic compound. Aqueous solutions are preferred. The ionic compound in the recovery compartment may be the same or different from the acid in the feed compartment. The ionic compound in the recovery compartment may be the same or different from the ionic compound in the anolyte compartment. Any ionic compound can be used in the recovery compartment, but in a preferred embodiment the ionic compound in the recovery compartment is the same as the acid in the feed compartment thereby contributing to preparing hydroxylamine of higher purity. The concentration of the ionic compound in the recovery compartment is from about 0.01M to about 5M, and preferably from about 0.1M to about 0.5M. The concentration of the ionic compound in the recovery compartment may be the same, higher or lower than the concentration of the ionic compound in the anolyte compartment or the acid in the acidic electrolyte.

Hydroxylammonium salt is produced in the feed compartment containing nitrogen containing gas and the acidic electrolyte by applying a current between the anode and cathode with an apparent current density of about 10 to about 500, more often from about 50 to 150 $mA/cm^2$ at about 6 volts to about 12 volts. The current is applied to the electrochemical cell for a period of time effective to produce the hydroxyammonium salt in the feed compartment at a desired concentration. The electrochemical cell may be maintained at a temperature suitable for the production of hydroxylammonium salt and hydroxylamine. The temperature is from about 1° C. to about 70° C., and preferably from about 20° C. to about 40° C. The concentration of the hydroxylammonium salt produced in the feed compartment is from about 0.01M to about 5M, and preferably from about 2M to about 3M.

A portion of the hydroxylammonium salt is then either recovered or physically transferred to the recovery compartment. This may be accomplished on an intermittent or continuous basis by methods known to those skilled in the art. The current applied to the electrochemical cell causes anions to migrate to the anolyte compartment and produces hydroxylamine in the recovery compartment. Hydroxylamine may then be obtained from the recovery compartment. In a preferred embodiment, the hydroxylamine solution obtained from the recovery compartment may be further purified using techniques known by those skilled in the art including distillation and reverse osmosis as described more fully below. Further purification may also be accomplished by electrodialysis techniques known by those skilled in the art.

In a preferred embodiment, acid generated in the anolyte compartment may be transferred to the feed compartment. In this embodiment, the acid is recycled thereby decreasing the amount of acid necessary to carry out the inventive methods.

The electrochemical cell can be operated batchwise or in a continuous operation. Circulation is effected by pumping and/or by gas evolution. In one embodiment, the acid concentration in the anolyte is maintained at a substantially constant concentration by the employment of a waterfeed into the anolyte compartment. Nitrogen containing gas and acid electrolyte can be added periodically or continuously to the feed compartment to maintain an appropriate concentration.

During the electrochemical process, it is generally desirable that the temperature of the liquids within the cell be maintained within the range of from about 1° C. to about 70° C., preferably from about 20° C. to about 40° C., and particularly the temperature is maintained at about 30° C. to about 35° C. during the electrochemical process. Also during the electrochemical process, it is generally desirable that the pH of the liquids within the cell be maintained within certain ranges. Since the pH of the cell changes over the course of practicing the present invention, and since the pH of the individual compartments varies, the following parameters are provided. In the anolyte and feed compartments, the pH range may be from about 0 to about 3, and preferably below about 2, and more preferably below about 1. In the recovery compartment, the pH range may be from about 1 to about 13, and preferably from about 2 to about 10, and more preferably from about 5 to about 9.

The solution obtained from the recovery compartment containing hydroxylamine can be further purified using distillation, reverse osmosis membrane technology, and electrodialysis. Distillation techniques are known by those skilled in the art. For example, the hydroxylamine solution obtained from the recovery compartment can be further purified using vacuum distillation.

Reverse osmosis membranes are available from Fluid Systems, Filmtech, Osmonics, Inc., Desalination Systems Inc., and others. Specific examples include Fluid Systems TFCL-HP thin film composite membrane. Reverse osmosis membrane technology is known by those skilled in the art. For example, the hydroxylamine solution obtained from the recovery compartment containing hydroxylammonium salts is sent through a reverse osmosis membrane (for instance, polyamide based membrane) under high pressure (over 100 and often over 500 psi). Hydroxylamine passes through the membrane whereas the hydroxylammonium salts do not. Reverse osmosis membranes generally permit water and small molecular weight organics (such as hydroxylamine) to pass through while not permitting ionic compounds to pass.

The hydroxylamine solution obtained from the recovery compartment can be further purified using electrodialysis in an electrodialytic cell. Electrodialytic techniques are known by those skilled in the art. For example, an electrodialytic cell can be provided containing, beginning at the cathode, a cathode, a bipolar membrane, an anion selective membrane (and optionally another bipolar membrane and another anion selective membrane), and an anode thereby defining, beginning again at the cathode, a water compartment, a feed-recovery compartment (and optionally a second acid compartment, and a second feed-recovery compartment), and an acid compartment. Water is charged to the water compartment, a hydroxylamine solution to be purified is charged to the feed-recovery compartment, and an acid solution is charged to the acid compartment. A current is applied and undesirable impurities migrate from the feed-recovery compartment to the acid compartment. A purified hydroxylamine solution is recovered from the feed-recovery compartment.

These additional procedures are effective for removing additional impurities that may be present in the solution obtained from the recovery compartment. The additional impurities include undesirable salts, metals and large molecular weight organic materials.

Examples of electrochemical cells useful in the processes of the present invention are discussed below and shown in FIGS. 1 and 3.

Referring to FIG. 1, the electrochemical cell 10 is made of a cathode 11, an anode 12, and in sequence beginning at the cathode 11, a bipolar membrane 13 and a divider 14. In a preferred embodiment, the divider 14 is an anion selective membrane. The bipolar membrane 13 has an anion selective side (not shown) facing the anode and a cation selective side (not shown) facing the cathode. The electrochemical cell 10 contains three compartments; namely, a feed compartment 15, a recovery compartment 16, and an anolyte compartment 17. The cathode 11 is a gas diffusion cathode. A gas chamber 18 is positioned next to the cathode 11.

In operation of the electrochemical cell illustrated in FIG. 1, an acidic electrolyte containing an acid and water is charged to the feed compartment 15. An aqueous solution containing an ionic compound is charged to the recovery compartment 16 and the anolyte compartment 17. The ionic compound is at a first concentration in the recovery compartment and at a second concentration in the anolyte compartment 17. The gas chamber 18 is filled with nitrogen containing gas. Under pressure, the nitrogen containing gas passes through the cathode 11 and enters the feed compartment 15. The pressure should be sufficient to force the nitrogen containing gas through the gas diffusion cathode, but not significantly greater. An electrical potential is established and maintained between the anode and the cathode to produce a flow of current across the electrochemical cell whereupon a hydroxylammonium salt is produced in the feed compartment 15. A portion of the hydroxylammonium salt is either collected or physically removed from the feed compartment 15 as shown by line 19 and transferred to the recovery compartment 16. As a result of the electrical potential maintained between the anode and the cathode, the salt (anion) of the hydroxylammonium salt is attracted towards the anode 12 thereby passing through the divider 14 into the anolyte compartment 17. Hydroxylamine is produced in the recovery compartment 16. Hydroxylamine is then recovered from the recovery compartment 16.

In a preferred embodiment, a portion of the solution in the anolyte compartment may be physically removed and transferred, as shown by line 20, to the feed compartment 15. In an even more preferred embodiment, the acid solution obtained from the anolyte compartment is concentrated before it is added to the feed compartment. As the salt anion from the hydroxylammonium salt migrates through the divider 14 into the anolyte compartment 17, an acid corresponding to the salt is produced in the anolyte compartment. Since the feed compartment 15 must contain a certain minimum concentration of acid, the acid produced in the anolyte compartment may be transferred to the feed compartment thereby recycling the acid used in the methods of the present invention thereby eliminating the need to constantly or intermittently add fresh acid to the feed compartment. As a result, substantial cost and environmental benefits are realized. In this preferred embodiment, the ionic compound charged into the recovery and anolyte compartments is the acid which is contained in the acidic electrolyte charged into the feed compartment.

As needed, various compounds such as one or more acids, water, one or more ionic compounds, nitrogen containing gas, stabilizers and the like may be added or recovered from the feed, recovery and anolyte compartments in order to maintain efficient operation of the electrochemical cell. For example, acid and nitrogen containing gas must be continuously or intermittently added to the feed compartment. From time to time, it may also be necessary to intermittently or continuously remove acid from the anolyte compartment.

Although the embodiment described in FIG. 1 illustrates the formation of a generic hydroxylammonium salt, the electrochemical cells and the method described can be utilized to prepare many desired specific hydroxylammonium salts by utilizing the different acids described above. Thus, a hydroxylammonium chloride salt can be prepared utilizing hydrochloric acid solutions, a hydroxylammonium sulfate salt can be prepared utilizing sulfuric acid solutions, a hydroxylammonium nitrate salt can be prepared utilizing nitric acid solutions, hydroxylammonium borate salts can be prepared utilizing boric acid, and formate or acetate salts can be prepared by utilizing formic acid or acetic acid.

Figure 3:
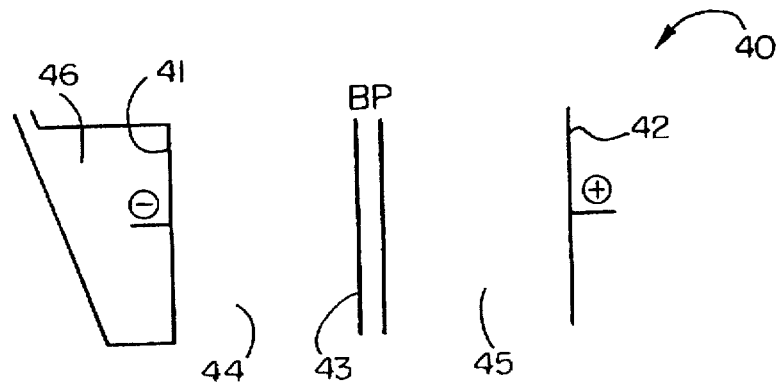
FIG. 3 is a schematic cross-section of an electrochemical cell useful in preparing hydroxylammonium salts of the invention.

Referring to FIG. 3, the electrochemical cell 40 is made of a cathode 41, an anode 42, and a bipolar membrane 43. The bipolar membrane 13 has an anion selective side (not shown) facing the anode and a cation selective side (not shown) facing the cathode. The electrochemical cell 40 contains two compartments; namely, a feed compartment 44 and an anolyte compartment 45. The cathode 41 is a gas diffusion cathode. A gas chamber 46 is positioned next to the cathode 41.

In operation of the electrochemical cell illustrated in FIG. 3, an acidic electrolyte containing an acid and water is charged to the feed compartment 44. An aqueous solution containing an ionic compound is charged to the anolyte compartment 45. The gas chamber 46 is filled with nitrogen containing gas. Under pressure, the nitrogen containing gas passes through the cathode 41 and enters the feed compartment 44. The pressure should be sufficient to force the nitrogen containing gas through the gas diffusion cathode, but not significantly greater. An electrical potential is established and maintained between the anode and the cathode to produce a flow of current across the electrochemical cell whereupon a hydroxylammonium salt is produced in the feed compartment 44. A hydroxylammonium salt is recovered from the feed compartment 44.

The following specific examples illustrate the preparation of the hydroxylammonium salts of the present invention. Unless otherwise indicated in the examples and elsewhere in the specification and claims, all parts and percentages are by weight, temperatures are in degrees centigrade, and pressures are at or near atmospheric pressure.

EXAMPLE 1

An electrochemical cell according to FIG. 1 is assembled. The anode is a dimensionally stable anode made of ruthenium oxide on titanium. The cathode is an ELAT type gas diffusion cathode having an integrated stainless steel mesh current collector with an alloy of PtCo on a hydrophobic PTFE containing Vulcan XC-72 carbon. The bipolar membrane is a Neosepta BP-1 and the divider is an anion selective membrane identified as Neosepta AMH manufactured by Tokuyama Corporation. The gas chamber is filled with a mixture of nitrogen and nitric oxide gas under pressure. The anolyte and recovery compartments are charge with 0.5M aqueous sulfuric acid while the feed compartment is charged with 1.0M aqueous sulfuric acid. A current of 9 amps (100 mA/cm$^2$) is applied for approximately six hours with an initial cell voltage of about 8 volts. Hydroxylammonium sulfate is produced in the feed compartment and reaches a concentration of about 2.0M and about 0.1M diammonium sulfate as an impurity. A portion of the solution from the feed compartment is transferred to the recovery compartment. Sulfate anions migrate from the recovery compartment through the anion exchange membrane into the anolyte compartment and may be recovered as sulfuric acid for recycling to the feed compartment. Hydroxylamine is thereby produced in the recovery compartment at 3.5M with minimal ammonium content and about 0.2M hydroxylammonium sulfate.

EXAMPLE 2

An electrochemical cell according to FIG. 1 is assembled. The anode is a dimensionally stable anode made of ruthenium oxide on titanium. The cathode is an ELAT type gas diffusion cathode having an integrated stainless steel mesh current collector with an alloy of PtCo on a hydrophobic PTFE containing Vulcan XC-72 carbon. The bipolar membrane is a Neosepta BP-1 and the divider is an anion selective membrane identified as Neosepta AMH manufactured by Tokuyama Corporation. The gas chamber is filled with a mixture of nitrogen and nitric oxide gas under pressure. The anolyte and recovery compartments are charge with 0.5M aqueous nitric acid while the feed compartment is charged with 1.0M aqueous nitric acid. A current of 9 amps (100 mA/cm$^2$) is applied for approximately six hours with an initial cell voltage of about 8 volts. Hydroxylammonium nitrate is produced in the feed compartment and reaches a concentration of about 2.0M and about 0.1M ammonium nitrate as an impurity. A portion of the solution from the feed compartment is transferred to the recovery compartment. Nitrate anions migrate from the recovery compartment through the anion exchange membrane into the anolyte compartment and may be recovered as nitric acid for recycling to the feed compartment. Hydroxylamine is thereby produced in the recovery compartment at 3.5M with minimal ammonium content and about 0.2M hydroxylammonium nitrate.

EXAMPLE 3

An electrochemical cell according to FIG. 1 is assembled. The anode is a dimensionally stable anode. The cathode is an ELAT type gas diffusion cathode having an integrated stainless steel mesh current collector with an alloy of PtCo on a hydrophobic PTFE containing Vulcan XC-72 carbon. The bipolar membrane is a Neosepta BP-1 and the divider is an anion selective membrane. The gas chamber is filled with a mixture of argon and nitric oxide gas under pressure. The anolyte and recovery compartments are charge with 0.5M aqueous acetic acid while the feed compartment is charged with 1.0M aqueous acetic acid. A current of 9 amps (100 mA/cm$^2$) is applied for approximately six hours with a cell voltage of about 20 volts. Hydroxylammonium acetate is produced in the feed compartment and reaches a concentration of about 2.0M and about 0.1M ammonium acetate as an impurity. A portion of the solution from the feed compartment is transferred to the recovery compartment. Acetate anions migrate from the recovery compartment through the anion exchange membrane into the anolyte compartment and may be recovered as acetic acid for recycling to the feed compartment. Hydroxylamine is thereby produced in the recovery compartment at 3.5M with minimal ammonium content and about 0.1M hydroxylammonium acetate.

EXAMPLE 4

The general procedure of Example 1 is followed except that the anion selective membrane is Neosepta ACM. The concentration of sulfuric acid in the anolyte compartment is maintained at 1.5M. Hydroxylamine is produced in the recovery compartment at 3M with minimal ammonium content and about 0.1M hydroxylammonium sulfate.

EXAMPLE 5

The procedure outlined in Example is repeated. The solution obtained from the recovery compartment in Example 1 is further processed as follows. Hydroxylamine is separated from the other solution components such as hydroxylammonium salt and diammonium sulfate by reverse osmosis membrane technology using a reverse osmosis membrane identified as Fluid Systems TFCL-HP thin film composite membrane. The hydroxylamine concentration after using a reverse osmosis membrane is about 4M.

EXAMPLE 6

An electrochemical cell according to FIG. 1 is assembled. The anode is a dimensionally stable anode. The cathode is an EFCG type gas diffusion cathode having an integrated stainless steel mesh current collector with an alloy of PtCo on a Toray carbon substrate. The bipolar membrane is a Neosepta BP-1 and the divider is an anion selective membrane identified as Neosepta AMH manufactured by Tokuyama Corporation. The gas chamber is filled with a mixture of nitrogen and nitric oxide gas under pressure. The anolyte and recovery compartments are charge with 0.5M aqueous sulfuric acid while the feed compartment is charged with 1.0M aqueous sulfuric acid. A current of 75 mA/cm$^2$ is applied for approximately six hours with an initial cell voltage of about 8 volts. Hydroxylammonium sulfate is produced in the feed compartment and reaches a concentration of about 2.0M and about 0.1M diammonium sulfate as an impurity. A portion of the solution from the feed compartment is transferred to the recovery compartment. Sulfate anions migrate from the recovery compartment through the anion exchange membrane into the anolyte compartment and may be recovered as sulfuric acid for recycling to the feed compartment. Hydroxylamine is thereby produced in the recovery compartment at 3.5M with minimal ammonium content and about 0.2M hydroxylammonium sulfate. The hydroxylamine solution obtained from the recovery compartment is further purified using vacuum distillation. After distillation, the hydroxylamine concentration is increased to about 4M.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

What is claimed is:
1. A method of electrochemically preparing hydroxylamine, comprising the steps of:
  (A) providing an electrochemical cell comprising an anode, a cathode, a bipolar membrane positioned between the anode and the cathode, the bipolar membrane having an anion selective side facing the anode and a cation selective side facing the cathode, and a divider positioned between the bipolar membrane and the anode, to define a feed compartment on the cation selective side of the bipolar membrane, a recovery compartment on the anion selective side of the bipolar membrane, and an anolyte compartment between the divider and the anode;
  (B) charging the feed compartment with an acidic electrolyte and the recovery and anolyte compartments with a solution;
  (C) introducing nitrogen containing gas into the feed compartment;
  (D) passing a current through the electrochemical cell to produce hydroxylammonium salt in the feed compartment;
  (E) transferring at least a portion of the hydroxylammonium salt from the feed compartment to the recovery compartment to produce hydroxylamine in the recovery compartment; and
  (F) recovering hydroxylamine from the recovery compartment.

2. The method of claim 1, wherein in step (B) the recovery and anolyte compartments are charged with an aqueous solution of an ionic compound.

3. The method of claim 1, wherein the cathode is a gas diffusion cathode and the nitrogen containing gas is introduced into the feed compartment through the gas diffusion cathode.

4. The method of claim 1, wherein the cathode comprises at least one of platinum, carbon, silver and gold.

5. The method of claim 4, wherein the cathode further comprises cobalt.

6. The method of claim 1, wherein the acidic electrolyte contains at least one acid selected from nitric acid, phosphoric acid and sulfuric acid.

7. The method of claim 1 further comprising the step of further purifying the hydroxylamine recovered from the recovery compartment by at least one of distillation and reverse osmosis.

8. The method of claim I further comprising the step of further purifying the hydroxylamine recovered from the recovery compartment by electrodialysis.

9. The method of claim 1, wherein the divider is an anion selective membrane.

10. A method of electrochemically preparing hydroxylamine, comprising the steps of:
  (A) providing an electrochemical cell comprising an anode, a gas diffusion cathode, a bipolar membrane positioned between the anode and the cathode, and an anion selective membrane positioned between the bipolar membrane and the anode, the bipolar membrane having an anion selective side facing the anode and a cation selective side facing the cathode, to define a feed compartment on the cation selective side of the bipolar membrane, a recovery compartment between the anion selective side of the bipolar membrane and the anion selective membrane, and an anolyte compartment between the anion selective membrane and the anode;
  (B) charging the recovery and anolyte compartments with a solution of an ionic compound and the feed compartment with an acidic electrolyte;

(C) introducing nitrogen oxide gas into the feed compartment;

(D) passing a current through the electrochemical cell to produce hydroxylammonium salt in the feed compartment;

(E) transferring at least a portion of the hydroxylammonium salt from the feed compartment to the recovery compartment to produce hydroxylamine in the recovery compartment; and (F) recovering hydroxylamine from the recovery compartment.

11. The method of claim 10, wherein the acidic electrolyte and the ionic compound are the same, and the method further comprises transferring at least a portion of the acid from the anolyte compartment to the feed compartment.

12. The method of claim 10, wherein the cathode comprises at least one of platinum, carbon, silver and gold.

13. The method of claim 12, wherein the cathode further comprises cobalt.

14. The method of claim 1 0, wherein the nitrogen oxide gas comprises nitric oxide.

15. The method of claim 10 further comprising the step of further purifying the hydroxylamine recovered from the recovery compartment by distillation.

16. The method of claim 10 further comprising the step of further purifying the hydroxylamine recovered from the recovery compartment by at least one of reverse osmosis and electrodialysis.

17. The method of claim 10, wherein in step (B), the recovery and anolyte compartments are charged with an aqueous solution of an acid.

18. The method of claim 10, wherein in step (B), the acidic electrolyte is aqueous sulfuric acid and the recovery and anolyte compartments are charged with an aqueous solution of sulfuric acid having a concentration of sulfuric acid lower than a concentration of sulfuric acid in the feed compartment.

19. A method of electrochemically preparing a hydroxylammonium salt, comprising the steps of:

(A) providing an electrochemical cell comprising an anode, a cathode, and a bipolar membrane positioned between the anode and the cathode, the bipolar membrane having an anion selective side facing the anode and a cation selective side facing the cathode, to define a feed compartment on the cation selective side of the bipolar membrane and an anolyte compartment on the anion selective side of the bipolar membrane;

(B) charging the feed compartment with an acidic electrolyte and the anolyte compartment with water;

(C) introducing nitrogen oxide gas into the feed compartment;

(D) passing a current through the electrochemical cell to produce a hydroxylammonium salt in the feed compartment; and (E) recovering the hydroxylammonium salt from the feed compartment.

20. The method of claim 19, wherein in step (B) the anolyte compartment is charged with an aqueous solution of an ionic compound.

* * * * *